(12) United States Patent  
Boxley et al.

(10) Patent No.: US 8,522,720 B2  
(45) Date of Patent: *Sep. 3, 2013

(54) ENVIRONMENTALLY-FRIENDLY ANIMAL LITTER

(75) Inventors: Chett Boxley, Park City, UT (US); Jessica McKelvie, Sandy, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,104

(22) Filed: Oct. 10, 2011

(65) Prior Publication Data

US 2012/0024235 A1    Feb. 2, 2012

Related U.S. Application Data

(63) Continuation-in-part of application No. 12/881,994, filed on Sep. 14, 2010, now Pat. No. 8,251,016.

(60) Provisional application No. 61/242,612, filed on Sep. 15, 2009.

(51) Int. Cl.  
*A01K 1/015* (2006.01)

(52) U.S. Cl.  
USPC .......................................................... 119/171

(58) Field of Classification Search  
USPC ........................................ 119/171, 172, 173  
See application file for complete search history.

(56) References Cited

U.S. PATENT DOCUMENTS

| | | |
|---|---|---|
| 3,941,536 A | 3/1976 | Akerlow |
| 3,972,971 A | 8/1976 | Dantoni |
| 4,129,094 A | 12/1978 | Stockel |
| 4,157,696 A | 6/1979 | Carlberg |
| 4,217,858 A | 8/1980 | Dantoni |
| 4,311,115 A | 1/1982 | Litzinger |
| 4,494,481 A | 1/1985 | Rodriguez et al. |
| 4,494,482 A | 1/1985 | Arnold |
| 4,506,628 A | 3/1985 | Stockel |
| 4,517,919 A | 5/1985 | Benjamin et al. |
| 4,571,389 A | 2/1986 | Goodwin et al. |
| 4,622,920 A | 11/1986 | Goss |
| 4,641,605 A | 2/1987 | Gordon |
| 4,683,318 A | 7/1987 | Deffeves et al. |
| 4,744,374 A | 5/1988 | Deffeves et al. |
| 4,914,066 A | 4/1990 | Woodrum |
| 5,109,805 A | 5/1992 | Baldry et al. |

(Continued)

OTHER PUBLICATIONS

Tsang, Lisa L., "Non-Final Office Action", U.S. Appl. No. 13/540,876, (Oct. 3, 2012),1-8.

(Continued)

*Primary Examiner* — Rob Swiatek  
*Assistant Examiner* — Lisa Tsang  
(74) *Attorney, Agent, or Firm* — David Fonda

(57) ABSTRACT

An animal litter composition that includes geopolymerized ash particulates having a network of repeating aluminum-silicon units is described herein. Generally, the animal litter is made from a quantity of a pozzolanic ash mixed with an alkaline activator to initiate a geopolymerization reaction that forms geopolymerized ash. This geopolymerization reaction may occur within a pelletizer. After the geopolymerized ash is formed, it may be dried and sieved to a desired size. These geopolymerized ash particulates may be used to make a non-clumping or clumping animal litter or other absorbing material. Aluminum sulfate, clinoptilolite, silica gel, sodium alginate and mineral oil may be added as additional ingredients.

3 Claims, 5 Drawing Sheets

(56) References Cited

U.S. PATENT DOCUMENTS

| | | |
|---|---|---|
| 5,188,064 A | 2/1993 | House |
| 5,207,830 A | 5/1993 | Cowan et al. |
| 5,228,900 A | 7/1993 | Stephens et al. |
| 5,325,816 A | 7/1994 | Pattengill et al. |
| 5,415,131 A | 5/1995 | Dodman |
| 5,482,007 A | 1/1996 | Kumlin |
| 5,630,377 A | 5/1997 | Kumlin |
| 5,900,258 A | 5/1999 | Engler |
| 6,253,710 B1 | 7/2001 | Ward et al. |
| 6,287,550 B1 | 9/2001 | Trinh et al. |
| 6,745,720 B2 | 6/2004 | Rasner et al. |
| 6,747,067 B2 | 6/2004 | Melnichuk et al. |
| 6,803,033 B2 | 10/2004 | McGee et al. |
| 6,964,704 B2 | 11/2005 | Cox et al. |
| 7,316,201 B2 | 1/2008 | Rasner et al. |
| 7,331,309 B2 | 2/2008 | BurckBuchler |
| 7,335,254 B2 | 2/2008 | Bruce et al. |
| 8,251,016 B2 * | 8/2012 | Boxley et al. ............ 119/173 |
| 2004/0079293 A1 | 4/2004 | Rasner et al. |
| 2005/0005870 A1 | 1/2005 | Fritter et al. |
| 2005/0176599 A1 | 8/2005 | Bergquist et al. |
| 2006/0112894 A1 | 6/2006 | Ikegami et al. |
| 2006/0243212 A1 | 11/2006 | Jenkins et al. |
| 2007/0289543 A1 | 12/2007 | Petska et al. |
| 2009/0000562 A1 * | 1/2009 | Jenkins et al. ............ 119/173 |
| 2009/0126644 A1 * | 5/2009 | Thomas et al. ............ 119/171 |
| 2010/0132619 A1 | 6/2010 | Falcone et al. |
| 2010/0147225 A1 | 6/2010 | Lange et al. |
| 2011/0253055 A1 * | 10/2011 | Tang et al. ............ 119/173 |
| 2011/0303156 A1 | 12/2011 | Sikka et al. |
| 2012/0103269 A1 | 5/2012 | Matsuo et al. |

OTHER PUBLICATIONS

Hardjito, et al., ""On the Development of Fly Ash-Based Geopolymer Concrete,"", *ACI Materials Journal* (2004), avialable at http://petra.academia.edu/DjwantroroHardjito/Papers?479294/on_the_development_of_fly_ash-based_geopolymer_concrete, (Nov. 1, 2004).

Joo-Hyung, Heo "International Search Report", *International Search Report* for PCT/US2010/048799, (May 24, 2011),1-3.

Joo-Hyung, Heo "Written Opinion of the International Searching Authority", Written Opinion for PCT/US2010/048799, (May 24, 2011),1-4.

Tsang, Lisa "Office Action", *Office Action* for U.S. Appl. No. 12/881,994, (Feb. 23, 2012),1-8.

Tsang, Lisa "Notice of Reference Cited", *Notice of Reference* Cited against U.S. Appl. No. 12/881,994, (Feb. 23, 2012),1-1.

Hardjito, et al., ""On the Development of Fly Ash-Based Geopolymer Concrete,"", *ACI Materials Journal* (2004), avialable at http://petra.academia.edu/DjwantroroHardjito/Papers?479294/on_the_development_of_fly_ash-based_geopolymer_concrete, (Nov. 1, 2004), 467-472.

Joo-Hyung, Heo "International Search Report", *International Search Report* for PCT/US2010/048799, 1-3.

Joo-Hyung, Heo "Written Opinion of the International Searching Authority", *Written Opinion* for PCT/US2010/048799, 1-4.

Tsang, Lisa "Office Action", *Office Action* for U.S. Appl. No. 12/881,994, (Feb. 23, 2012),1-9.

* cited by examiner

ENVIRONMENTALLY-FRIENDLY ANIMAL LITTER

RELATED APPLICATIONS

This application is a continuation-in-part of U.S. patent application Ser. No. 12/881,994 filed on Sep. 14, 2010, entitled "Environmentally-Friendly Animal Litter," (which issued as U.S. Pat. No. 8,251,016), which in turn, claims the benefit of U.S. Provisional Patent Application Ser. No. 61/242,612 filed Sep. 15, 2009, entitled "Environmentally-Friendly Animal Litter." These prior patent documents are expressly incorporated herein by reference.

U.S. GOVERNMENT INTEREST

This invention was made with government support under Contract No. DE-EE0000395 awarded by the U.S. Department of Energy. The government has certain rights in the invention.

TECHNICAL FIELD

The present disclosure relates generally to animal litters (such as cat litters). In particular, the present invention relates to an animal litter composition that is derived from a "fly ash" material or another similar material.

BACKGROUND

When domesticated animals, such as pets, live alongside humans, the animals' waste causes several problems, including the problems of unwanted odors, debris, and liquids. These problems are often solved through the use of an animal litter, such as a cat litter, that absorbs liquids and reduces odors.

A wide variety of animal litter products are currently commercially available that are made from various materials including, clays, silica gels, paper, wood chips, etc. Some animal litters, such as those that include silica gel, are relatively costly. The performance of each type of animal litter varies with regard to their effectiveness at deodorizing and dehydrating animal waste. Additionally, many conventional animal litter products are made from materials that have a limited availability or are becoming less economically feasible due to increasing manufacturing and shipping costs.

Accordingly, an improved animal litter product (such as a low-cost, highly-effective odor and liquid absorbing animal litter product) is desirable and is disclosed herein.

SUMMARY

U.S. patent application Ser. No. 12/881,994, which has been expressly incorporated herein by reference, teaches an animal litter product as well as a method of making an animal litter. This patent application has been published as U.S. Patent Application Publication No. 2011/0061598. The reader is presumed to be familiar with the disclosure of this published U.S. patent application.

The present embodiments include methods for treating one or more pozzolanic ashes to render the ashes usable as an animal litter. In some embodiments, the pozzolanic ash is "fly ash," which is described in greater detail below. The present embodiments may also comprise a process for converting the pozzolanic ash into a geopolymerized ash and then using the geopolymerized ash in an animal litter product.

In some embodiments, the described methods include providing a pozzolanic ash and providing a sufficient quantity of an alkaline activator and water and mixing these ingredients to initiate a geopolymerization reaction. This geopolymerization reaction produces an agglomerated mixture that may be collected and sized. This collection of particulates contains a geopolymerized ash and may then be used in an animal litter product. Other optional ingredients, such as a clumping agent (such as sodium alginate), a pH adjuster (such as aluminum sulfate), silica gel, clinoptilolite and/or mineral oil may also be added to the animal litter product.

In the described methods, the pozzolanic ash may comprise any suitable ash that is capable of forming an agglomerate when mixed with the described alkaline activator and water. Some examples of such ashes include fly ash, spray dryer ash, bottom ash, bark ash, bottom slag, boiler slag, and mixtures thereof.

The alkaline activator can be any chemical that has a sufficiently high pH and which is otherwise capable of initiating a geopolymerization reaction when the activator is reacted with the pozzolanic ash. Some examples of the alkaline activator include a metal carbonate, a metal silicate, a metal aluminate, a metal sulfate, a metal hydroxide, and mixtures thereof. In some embodiments, the alkaline activator comprises an alkali carbonate, such as sodium carbonate; an alkali hydroxide, such as sodium hydroxide; or mixtures thereof.

DETAILED DESCRIPTION

Figure 1:
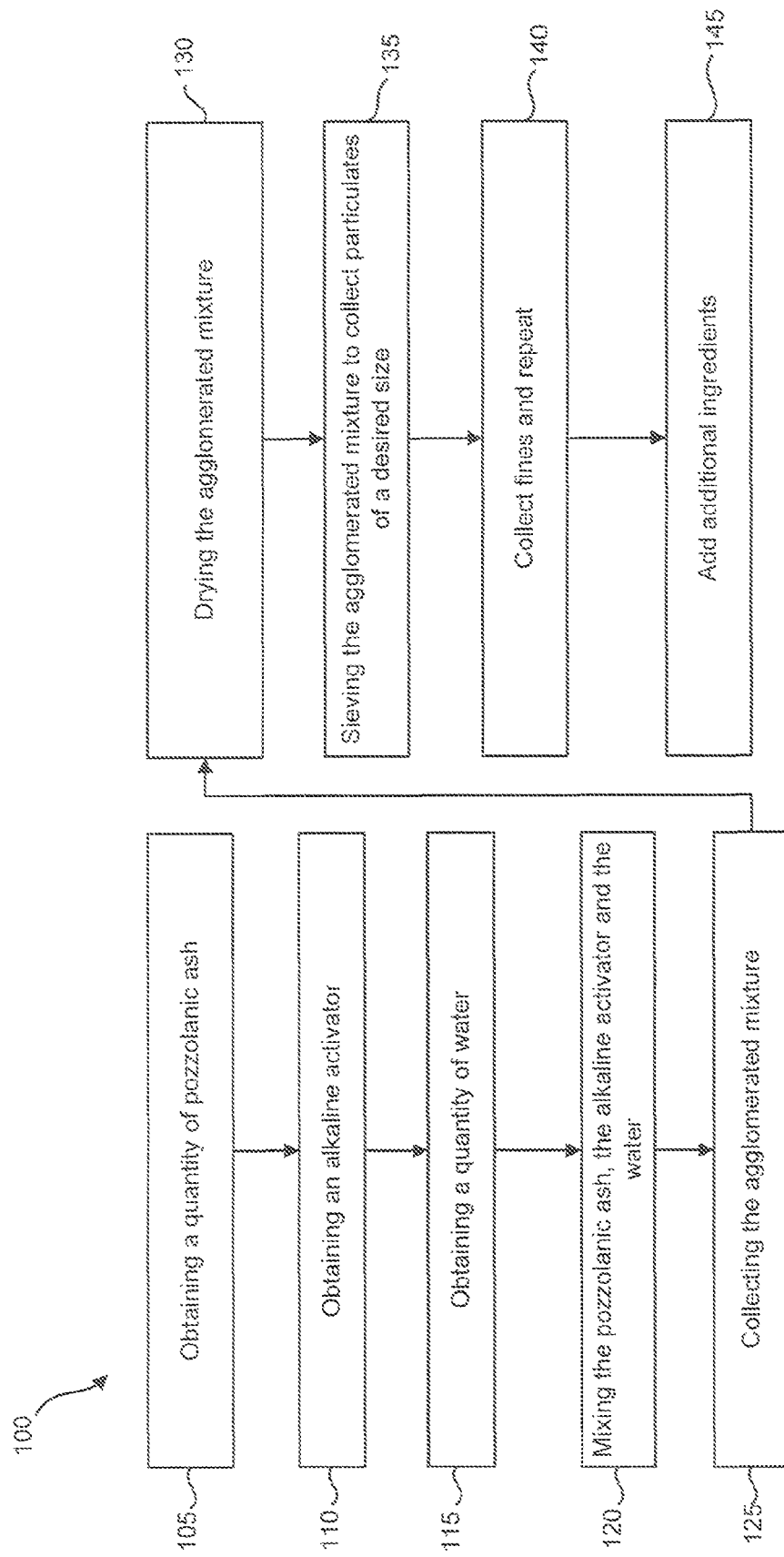
FIG. 1 is flow diagram illustrating an exemplary method for making an absorbent material (such as an animal litter) according to the present embodiments.

Fly ash is the finely divided mineral residue resulting from the combustion of pulverized coal in coal-fired power plants. Fly ash may also include a mixture of different ashes produced by the combustion of other fuel materials, including but not limited to bark ash and bottom ash. Fly ash may comprise inorganic, incombustible matter present in the coal or fuel that has been fused during combustion into a glassy, part-amorphous/part-crystalline structure.

In many coal-burning processes, fly ash material is solidified while suspended in the exhaust gases and is collected by electrostatic precipitators or filter bags. Since the particles solidify while suspended in the exhaust gases, fly ash particles are generally spherical in shape and range in size from 0.5 µm to 100 µm. The particles are made up mostly of silicon dioxide ($SiO_2$), aluminum oxide ($Al_2O_3$) and iron oxide ($Fe_2O_3$), and are hence a suitable source of aluminum and silicon for geopolymers. They are also pozzolanic in nature such that the particles react with sodium hydroxide, an alkali hydroxide, and/or other basic materials (such as carbonates) to form larger aggregates (which typically have particle sizes larger than 100 microns.

Fly ash has been classified into two classes (e.g., class F and class C), based on the chemical composition of the fly ash. According to ASTM C 618, the chemical requirements to classify any fly ash are shown in Table 1.

TABLE 1

The Chemical Requirements for Fly Ash Classification are provided below:

| Properties | Fly Ash Class | |
|---|---|---|
| | Class F | Class C |
| Minimum percentage of Silicon dioxide, aluminum oxide, iron oxide ($SiO_2 + Al_2O_3 + Fe_2O_3$) | 70.0 | 50.0 |
| Maxmimum percentage of Sulfur trioxide ($SO_3$) | 5.0 | 5.0 |
| Maxmimum percentage of Moisture Content, | 3.0 | 3.0 |
| Maxmimum percentage of material loss on ignition (LOI) | 6.0 | 6.0 |

Class F fly ash is produced from burning anthracite and bituminous coals. This fly ash has siliceous or siliceous and aluminous material, which itself possesses little or no agglomerate value; however this siliceous or siliceous and aluminous material may, in finely divided form and in the presence of moisture, chemically react with sodium hydroxide at ordinary temperature to form agglomerate compounds. Class C fly ash is produced normally from lignite and sub-bituminous coals, and some class C fly ashes may contain significant amounts (higher than 10% or even 20%) of calcium oxide (CaO) or lime. This class of fly ash, in addition to having pozzolanic properties, also has some agglomerate properties (ASTM C 618-99). Alkali and sulfur-containing compounds ($SO_2$ or $SO_3$) contents are generally higher in spray dryer ash materials.

Color is one of the important physical properties of fly ash in terms of estimating the carbon content qualitatively. It is suggested that lighter colors indicate low carbon contents and darker colors suggest high amounts of organic carbon content.

Coal combustion exhaust gases sometimes contain activated carbon or other similar powdered sorbents. The activated carbon is usually collected by electrostatic precipitators or filter bags together with the fly ash, this carbon is in addition to the natural unburned carbon content from the coal combustion process. Hence, collected fly ash may be combined with carbon. The carbon content of fly ash may range up to 50% by weight (for both added and unburned carbon). Because bark ash has high carbon content, fly ash materials that contain some bark ash may have a high carbon content. The intrinsic carbon content of any pozzolonic ash material used in the making of the animal litter may increase the performance of the litter product because of carbon's inherent odor control properties.

FIG. 1 illustrates a representative embodiment of a method for forming an animal litter comprising a geopolymerized ash using the starting materials described herein. The described method may be used to form any animal litter that comprises a geopolymerized ash.

Referring to FIG. 1, a flow chart is illustrated that shows an exemplary method 100 for forming an animal litter or other absorbent material that contains a geopolymerized ash. Specifically, FIG. 1 shows obtaining 105 a quantity of pozzolanic ash and obtaining 110 a quantity of an alkaline activator. Water is also obtained 115. The quantity of the pozzolanic ash, the quantity of the alkaline activator, and the water may be mixed 120 together. In some embodiments, the quantity of water and the quantity of the alkaline activator are pre-mixed together to form a solution. In this embodiment, the solution containing the water and the quantity of the alkaline activator may then be mixed 120 with the quantity of the pozzolanic ash to form a slurry. In other embodiments, the quantity of the pozzolanic ash may be mixed (dry blended) with a dry quantity of the alkaline activator. Once these dry components have been dry mixed, water may be added. This latter embodiment, which involves dry mixing the pozzolanic ash and the alkaline activator before the water is added, may be desirable in that the resultant product will flow easier and will be easier to spray or move into a different compartment (as needed) during the production process.

The method 100 may continue by having the pozzolanic ash, alkaline activator, and water mixed 120 together. (In some embodiments, this mixture may be a slurry.) This mixing process can be accomplished in any suitable manner. For example, the mixing 120 may be accomplished by placing the components in a container and then using any mechanical mixing process to mix the contents for a time period. In one embodiment, the contents are mixed for about 5 minutes. Other embodiments may mix the contents for greater periods of time, such as, for example, mixing the contents for up to multiple days. In one example in which the alkaline activator initially comprises a dry crystalline or dry powder material, the alkaline activator may be first added to enough water to dissolve the activator. This aqueous solution comprising the dissolved alkaline activator may then be added to the pozzolanic ash and additional amounts of water may further be added, as necessary, to form a homogeneous slurry. The time needed to mix the materials may depend upon the particular embodiment.

Figure 2:
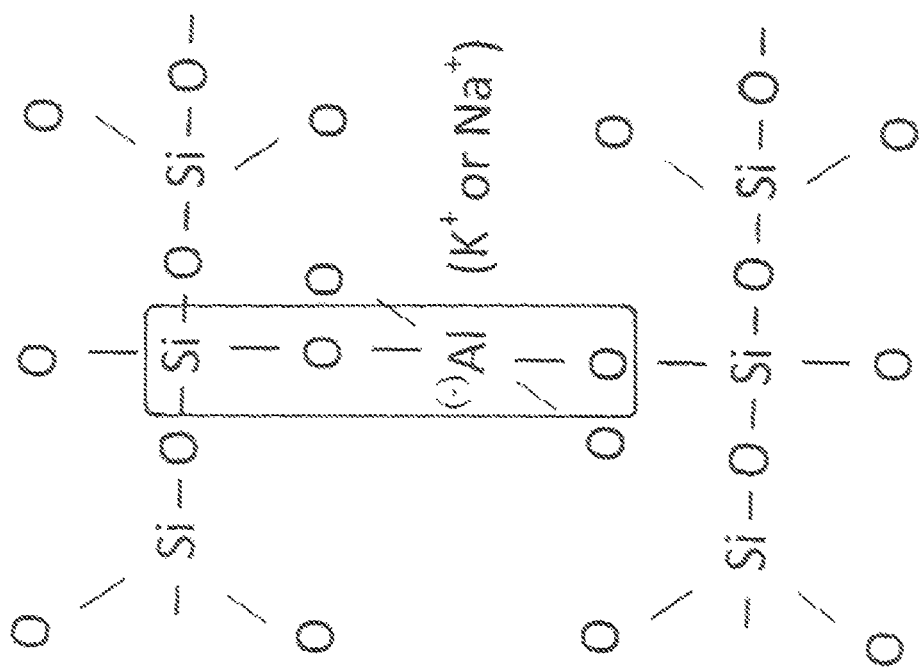
FIG. 2 illustrates a representative embodiment of geopolymer aluminosilicate repeating units found in geopolymerized ash formed according to the method of FIGS. 1 and 1A.

The mixing 120 of the quantity of the pozzolanic ash, the quantity of the alkaline activator, and the water is performed such that a geopolymerization reaction between these components is initiated. Specifically, geopolymerization occurs through the chemical dissolution of silica and alumina-based oxides within the pozzolanic ash. This dissolution occurs with the addition of the highly alkaline activator, followed by the subsequent re-condensation of various aluminosilicate oxides, which yield polymeric Si—O—Al—O bonds. Geopolymer materials may be three-dimensional aluminosilicate networks that form inorganic mineral polymers, which may contain a variety of amorphous and semi-crystalline phases. As used herein, the term geopolymer may represent a broad class of materials characterized by Al—Si repeating units. FIG. 2 shows an example of a repeating Si—O—Al—O unit (circled) that may be found in a geopolymer formed according to the present embodiments. A positively charge atom may be present to accomplish charge neutrality given the negative charge of the Aluminum atom. In one embodiment, the positively charges atom is Sodium. In other embodiments a Potassium atom may be used. It will be understood by one of skill in the art that any positively charged monovalent atom may be used.

This geopolymerization reaction operates to form an agglomerated mixture. This agglomerated mixture includes the geopolymer materials containing the Si—O—Al—O bonds. As will be described herein, the formed agglomerated mixture (which contains the geopolymer materials) may then be collected 125 and used in a variety of applications, including an animal litter product.

With respect to obtaining the pozzolanic ash (as shown at 105 in FIG. 1), the pozzolanic ash may comprise one or more of a variety of finely-divided mineral residues from the combustion of a solid fuel (such as coal), wherein the residues are capable of forming an agglomerate. Generally, the described pozzolanic ash comprises aluminum and silicon. For instance, the pozzolanic ash typically comprises silicon dioxide ("$SiO_2$"), aluminum oxide ("$Al_2O_3$"), and iron oxide ("$Fe_2O_3$"). Some non-limiting examples of such pozzolanic ashes comprise fly ash, spray dryer ash ("SDA"), bottom ash, bark ash, bottom slag, boiler slag, municipal solid waste incinerator ash, and mixtures thereof. In some exemplary embodiments, the pozzolanic ash comprises fly ash or SDA.

While fly ash from any suitable source can be used with the described method, fly ash may be obtained as a waste byproduct from certain combustion or chemical processes. For instance, fly ash and fly-ash-type products are commonly generated from the combustion of coal in power plants and in the manufacture of paper/pulp products. While the specific ingredients and concentration of ingredients in fly ash vary from one coal-combustion plant to another, fly ash typically contains inorganic, incombustible matter that was present in the coal or fuel that is fused together during combustion into a glassy, part-amorphous/part-crystalline structure. As fly ash is suspended in exhaust gases, it is often solidified before being collected by electrostatic precipitators or by filter bags. Because the particles solidify while they are suspended in the exhaust gases, fly ash particles are typically spherical in shape and range in size from about 0.5 µm to about 100 µm in diameter.

Where the pozzolanic ash comprises fly ash, the fly ash may be of any quality. For example, the fly ash can comprise a "premium-quality," a "standard-quality," and/or even a "low-quality" fly ash. Indeed, because low-quality fly ash is typically inexpensive as compared to premium-quality and standard-quality fly ash materials, use of a low-quality fly ash material may be preferred in some embodiments.

Where the pozzolanic ash comprises SDA, the SDA may have any suitable characteristic. As used herein, the term SDA may refer to a byproduct produced by a dry sorbent injection flue gas desulfurization (FGD) system. By way of explanation, many coal combustion processes utilize pollution control systems (such as FGD systems) to remove sulfur combustion products from gases. For example, many FGD systems include wet scrubbers, spray dry scrubbers, sorbent injectors, and a combined sulfur oxide (SOx) and nitrogen oxide (NOx) process. FGD sorbents include lime, limestone, sodium-based compounds, high-calcium coal fly ash and other materials. One known FGD system employs a dry sorbent injection process where the FGD sorbent is a powdered sodium sesquicarbonate that is blown into an air duct containing the flue gases. Sodium sesquicarbonate (which is also called trisodium hydrogendicarbonate, $(Na_3H(CO_3)_2)$) is a double salt of sodium bicarbonate and sodium carbonate ($NaHCO_3 \cdot Na_2CO_3$). The dihydrate sesquicarbonate ($NaHCO_3 \cdot Na_2CO_3 \cdot 2H_2O$) occurs in nature as the mineral trona. Thus, trona may be used in dry sorbent injection processes to remove the sulfur combustion products SOx ($SO_2$ and $SO_3$).

With respect to the SDA process, flue gases react with a powdered FGD sorbent, such as trona, hydrated lime, or sodium carbonate to neutralize the sulfur oxides (SOx) present in the flue gases and to form safe byproducts. The byproducts and any excess trona powder are typically removed from the flue gas stream using an electrostatic precipitator (ESP). The clean air is then discharged into the atmosphere through the exhaust stack. The material recovered in the ESP is known as SDA and includes a mixture of fly ash, reaction products such as neutralized SOx, as well as unreacted trona. While the precise composition of SDA may vary from one coal-combustion plant to another, SDA predominantly contains fly ash (about 70%) with remaining components being the neutralized SOx and unreacted trona.

In some typical embodiments of SDA there is at least 2.5 wt. % unreacted trona. Indeed, in some instances, SDA samples contain at least about 10 wt. % unreacted trona.

No matter which type of pozzolanic ash (e.g., fly ash, SDA, etc.) is used to create the described animal litter, the pozzolanic ash may have any suitable amount of carbon, but still allows the pozzolanic ash to function as intended. Indeed, in some embodiments, the pozzolanic ash used to make the geopolymerized ash comprises less than about 20% carbon, by weight. In one embodiment, the pozzolanic ash used to make the geopolymerized ash comprised between about 0.1% and about 20% carbon. In other embodiments, the pozzolanic ash comprises less than about 15% carbon, by weight. In still other embodiments, the pozzolanic ash comprises less than about 5% carbon, by weight. While the carbon may perform any suitable function, it is theorized that carbon in the pozzolanic ash may tend to increase the animal litter's ability to adsorb odors.

Referring now to the alkaline activator mentioned at 110 in FIG. 1, the alkaline activator may comprise any chemical that has a sufficiently high pH and which is otherwise capable of initiating a geopolymerization reaction when reacted with the pozzolanic ash. Moreover, while one or more ingredients of the alkaline activator may comprise pure ingredients, in some embodiments, the alkaline activator comprises recycled byproducts of industrial processes. Some examples of suitable components that may be used as the alkaline activator include metal carbonates, metal silicates, metal aluminates, metal sulfates, metal hydroxides, and mixtures thereof. In some embodiments, alkali metals, such as sodium or potassium, are used in the alkaline activator because of their availability and low cost. In some embodiments, the alkaline activator comprises an alkali carbonate, such as sodium carbonate ($Na_2CO_3$), an alkali hydroxide, such as sodium hydroxide (NaOH), or a mixture thereof. Table 2, which is listed below, shows some examples of pozzolanic ash as well as the exact amounts of sodium carbonate/sodium hydroxide that may be used as the alkaline activator in the present embodiments.

In the described method, any amount of alkaline activator that is capable of initiating a geopolymerization reaction when combined with water and the pozzolanic ash may be added. In some embodiments, between about 1% and about 20% of the alkaline activator (based upon the total dry weight of the mixture of alkaline activator and pozzolanic ash) is used in the reaction. In other embodiments, between about 3% and about 12% of the alkaline activator (based upon the total dry weight of the mixture of alkaline activator and pozzolanic ash) is used in the reaction. In further embodiments, between about 8% and about 9% of the alkaline activator (based upon the total dry weight of the mixture of alkaline activator and pozzolanic ash) is used in the reaction.

As noted above, water is added 115 to the pozzolanic ash. Any amount of water that allows the pozzolanic ash, the alkaline activator, and water to be mixed as a homogenous solution may be used. However, because some (or even all) of the added water needs to be later evaporated off, care may be taken to minimize the amount of water added. Thus, in some embodiments water is added to the pozzolanic ash and alkaline activator to form a solution in which only about 1% of the solution, by weight, comprises solid materials (e.g., the pozzolanic ash). In other embodiments, less water is added to the pozzolanic ash. In some embodiments, enough water is added to the pozzolanic ash and the alkaline activator to ensure that solid materials (e.g., pozzolanic ash) accounts for more than about 20% of the weight of the solution. In still other embodiments, enough water is added to the pozzolanic ash such that at least about 40% of the solution, by weight, would comprise solid materials (e.g., pozzolanic ash). In still other embodiments, enough water is added to the pozzolanic ash such that between about 60% and about 80% of the solution would comprise solid materials (e.g., pozzolanic ash).

TABLE 2

Examples of Geopolymerized Ash

| Sample Name | Type of Pozzolanic Ash | NaOH g/100 g of ash | Na$_2$CO$_3$ g/100 g of ash | % Solid Materials in Slurry |
|---|---|---|---|---|
| Pozzolanic Ash #1 | Class C | 1 | 2.5 | 67 |
| Pozzolanic Ash #2 | Class C | 3 | 3 | 68 |
| Pozzolanic Ash #3 | Class C | 6 | 0 | 71 |
| Pozzolanic Ash #4 | Class C | 0 | 6 | 67 |
| Pozzolanic Ash #5 | Class C | 6 | 6 | 71 |
| Pozzolanic Ash #6 | SDA | 6 | 0 | 70 |
| Pozzolanic Ash #7 | SDA | 10 | 0 | 64 |
| Pozzolanic Ash #8 | Class F | 1 | 2.5 | 69 |
| Pozzolanic Ash #9 | Class F | 6 | 6 | 69 |

Table 2 shows some exemplary embodiments in which between about 2 to about 12 parts of the alkaline activator were added for every 100 parts of the pozzolanic ash, by dry weight. In still other embodiments, however, between about 3.5 and about 12 grams of the alkaline activator may be added for every 100 grams of the pozzolanic ash, by dry weight. For instance, Table 2 shows that for every 100 grams of Pozzolanic Ash #4, 0 gram of NaOH and 6 grams of Na$_2$CO$_3$ are added to the ash.

Table 2 also shows several embodiments in which the amount of water added is limited such that the water content accounts for between about 36% (e.g., in the case of Pozzolanic Ash #7) and about 29% (e.g., in the case of Pozzolanic Ashes #5 and #3) of the solution, by weight. All of the embodiments shown in Table 2 are exemplary and fall within the scope of at least one embodiment of the present disclosure.

Referring again to FIG. 1, after the agglomerated mixture has been formed (via the geopolymerization reaction) and collected 125, the mixture may be dried 130. For example, if the agglomerated mixture comprises a slurry, then the slurry may need to be dried. This drying process 130 may be accomplished in any suitable manner, including, but not limited to, drying at room temperature, heat drying, and/or vacuum-drying the geopolymerized ash. Drying over a fluidized bed may also be used. In certain embodiments, the geopolymerized ash is dried at room temperature or at a higher temperature. Additionally, in some embodiments, to speed the drying process, the mixture of geopolymerized ash may be spread thin (such as a thin layer) in order to have an increased surface area from which water can evaporate. A drum dryer and/or pelletizer apparatus may also be used. The geopolymerized ash may be dried to any suitable extent. For example, in some embodiments, the geopolymerized ash may be dried until its residual moisture content is between about 0.1% to about 5% water, by weight.

The geopolymerized ash may be dried at any suitable temperature. In some embodiments, the geopolymerized ash may be dried at a temperature of less than about 400° Celsius (C). In other embodiments, the geopolymerized ash may be dried at temperatures less than about 250° C. In still other embodiments, the geopolymerized ash may be dried at a temperature of less than about 110° C. In other embodiments the geopolymerized ash may be dried at a temperature of about 100° C.±5° C. In yet other embodiments, the geopolymerized ash may be dried at a temperature of less than about 80° C. In one embodiment, the geopolymerized ash may be dried at a temperature about 75° C.±5° C. In some embodiments, the drying process operates to provide clumps of the geopolymerized ash that will have a diameter that is in the micron or millimeter size range.

After the agglomerated mixture has been dried 130, some embodiments may be designed in which the mixture may be sized 135 to collect particulates of a desired size. In some embodiments, the sizing process may be accomplished by sieving the mixture. However, those skilled in the art will appreciate that any sizing process may be used (including those sizing processes that do not involve using a sieve.) For example, crushing may be used as the sizing process. The particulates of geopolymerized ash can be sorted with multiple sieves to any size range that is suitable for use in an animal litter product. In some embodiments, the geopolymerized ash may be sieved to have a sieve size between about a −12 sieve (about 1.7 millimeters (mm)) and about a +60 sieve (about 0.25 mm). In still other embodiments, the particulates of geopolymerized ash may be sieved to have a size range between about a −6 sieve (about 3.35 mm) and about a +50 sieve (about 0.6 mm). In still other embodiments, the particulates of geopolymerized ash may be sieved to have a size range between about a −12 sieve (about 3.35 mm) and about a +80 sieve Any particles that are too large to meet the size requirements may be further crushed or reduced in size to meet the desired size requirements.

FIG. 1 shows the method 100 optionally continues by having particulates of the geopolymerized ash that pass through the smallest sieve (e.g., "fines") be collected 140 and used to repeat the process. The fines can be used alone or with additional pozzolanic ash when the process is repeated. Indeed, in some embodiments, the fines may be mixed with a suitable amount of a pozzolanic ash that has not been treated with the alkaline activator and water. This process of collecting and recycling the fines may be repeated multiple times, as desired. By having the "fine" or smaller diameter particles pass through the sieve (and thus not used), the cat litter that is produced may have particulates that are large enough such that they do not form an inhalable dust when poured out of the container/bag. Similarly, in some embodiments, particles that are too large such that they fall outside the sieve range may also be collected and reused and/or re-added to the geopolymerization process. Alternatively, the particles that are "too large" such that they fall outside the sieve range may be crushed/ground to the right size.

The described steps found in the method 100 may be varied in any suitable manner. For instance, portions of the method 100 may be removed and/or be reordered in any suitable manner. In one example, instead of providing the pozzolanic ash before providing the alkaline activator and the water, the water and/or alkaline activator are provided before the pozzolanic ash. Accordingly, in this example, the pozzolanic ash may be added to the water and/or the alkaline activator.

In still another example, where SDA (spray dryer ash) is used as the pozzolanic ash, a smaller amount of the alkaline activator may be used to form the geopolymerized ash than that which is necessary for other types of pozzolanic ash materials (such as class C fly ash or class F fly ash). The reason for this is that class C or class F fly ash is substantially free from unreacted trona whereas SDA may include a quantity of unreacted trona. Because unreacted trona in the SDA contains carbonate compounds that can help initiate a geopolymerization reaction, the alkaline activator used to geopolymerize SDA may comprise less alkali carbonate (such as less sodium carbonate ($Na_2CO_3$)) than would be required for class C or F fly ash.

The described method 100 may (optionally) include adding additional ingredients 145, such as solid ingredients and/or liquid ingredients, to the mixture. These additional ingredients may be especially useful if the mixture is going to be used as an animal litter product. The use of these additional ingredients will be described in greater detail herein.

Figure 1A:
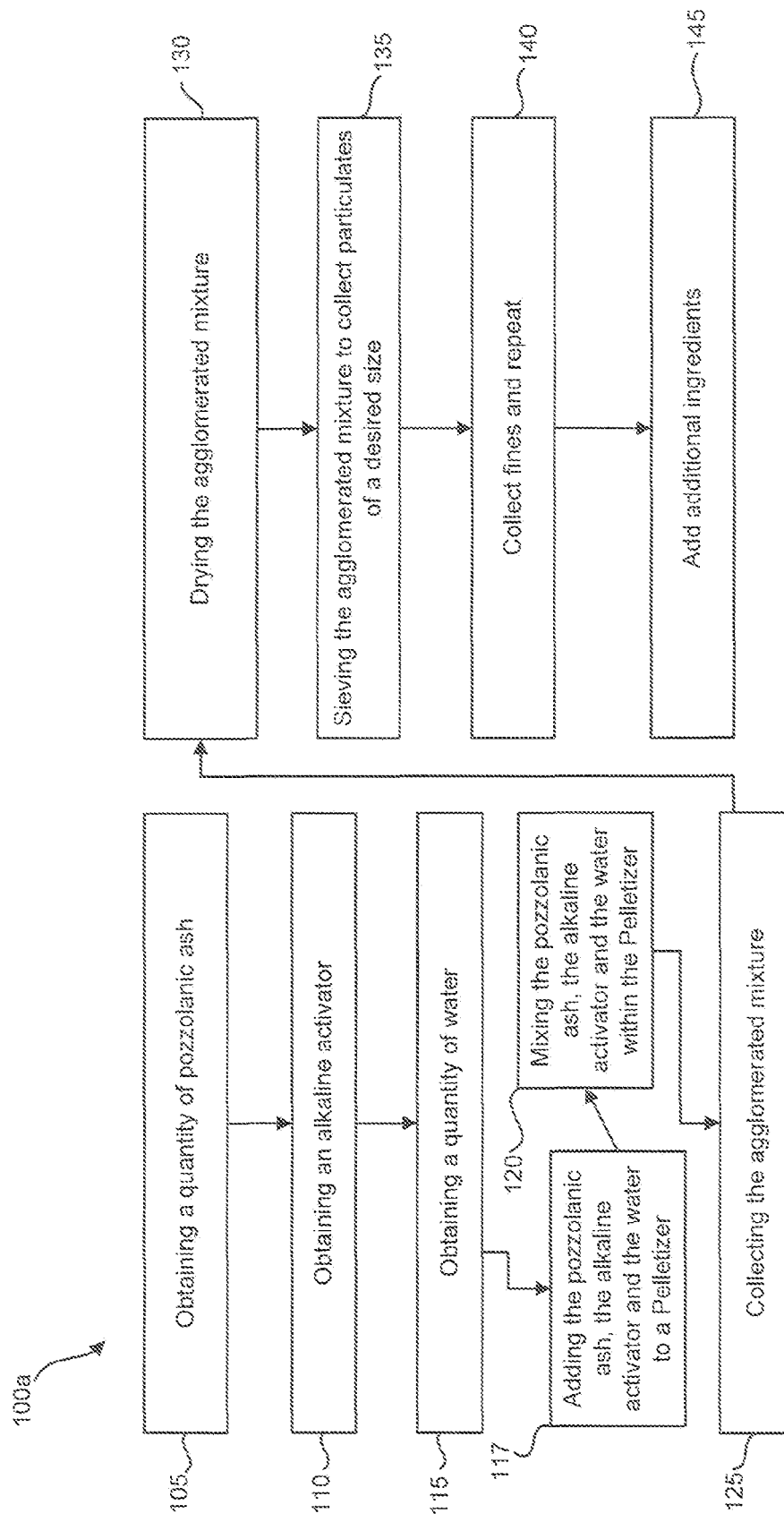
FIG. 1A is flow diagram illustrating another exemplary method for making an absorbent material (such as an animal litter) according to the present embodiments.

Referring now to FIG. 1A, an additional method 100a is illustrated. This method 100a is similar to the method 100 and may be used for forming an animal litter or other absorbent material that contains a geopolymerized ash. As with the method 100, the method 100a involves obtaining 105 a quantity of pozzolanic ash, obtaining a quantity of an alkaline activator 110, and obtaining 115 a quantity of water. In some embodiments, the quantity of water and the quantity of the alkaline activator are pre-mixed together to form a solution. Accordingly, when the solution of water and alkaline activator are mixed with the a quantity of pozzolanic ash, a slurry is formed. Alternatively, the quantity of the pozzolanic ash may be mixed (dry blended) with a dry quantity of the alkaline activator. Once these dry components have been dry mixed, water may be added.

As shown in FIG. 1A, the quantity of pozzolanic ash, the quantity of alkaline activator and the quantity of water may be added 117 to a pelletizer. A pelletizer is a known instrument that is capable of producing pellet-sized materials. The quantity of pozzolanic ash, the quantity of alkaline activator and the quantity of water may be mixed 120 within the pelletizer. In other words, the pelletizer serves as the vessel where the mixing of the reactants occurs. As this mixing occurs within the pelletizer, the geopolymerization reaction initiates/occurs within the pelletizer, thereby forming the quantity of geopolymerized ash. Any of the known, commercially-available pelletizers may be used in this process.

It should be noted that the pelletizer may produce pellets (agglomerates such as, for example, solids) of the geopolymerized ash that will fall within a size (diameter) range determined based upon the conditions established by the pelletizer (such as flow rates, RPM of the chamber, angle of the pelletizer, etc.). Those skilled in the art will appreciate how modifying one or more of these conditions may be performed to change/optimize the size distribution of solids that are obtained from the pelletizer.

Once the agglomerated mixture has been formed, this mixture may be collected 125 and dried 130. These processes are described above. Further, collecting the mixture may involve extracting the mixture from the pelletizer. After the mixture has been dried, a sieving process 135 (or other sizing process) may be used to collect particulates (solids) of a desired size. As noted above, the particles exiting the pelletizer will have a general size distribution (such as, for example, between a #200 and a #4 sieve size). If desired, the size of the particles may be further tailored by performing a sieving process 135. This sieving process 135 may be used to select any desired size of particles. In some embodiments, the agglomerated mixture has a sieve size that is between about a #50 sieve and a −6 sieve (when measured via standard U.S. sieves). Larger particles that fall outside of the sieve range may be ground, crushed or otherwise sized to the proper size while the fines (smaller particles) may be collected 140 and re-added to the pelletizer (as noted above).

As described herein, the methods 100, 100a may include the step of adding additional ingredients 145. The additional ingredients may be added at any suitable time during the method 100. For example, additional ingredients may be added to the geopolymerized ash while the ash is still wet, semi-dry, and/or dry. U.S. patent application Ser. No. 12/881,994 provides a variety of different additional ingredients that may be added to the mixture. All of the ingredients outlined in the above-recited patent application may be used in the present embodiments. However, for purposes of brevity, only a few of the possible additional ingredients will be discussed herein. These additional ingredients may be used to form an animal litter product from the geopolymerized ash.

For example, in making an animal litter product, an additional ingredient of a zeolite may be used. In one embodiment, the zeolite is a naturally-occurring zeolite and may be an odor eliminating agent. More specifically, odors found in an animal litter box may be associated with the chemical ammonia ($NH_3$), which is a gas that is formed from the decomposition of urea found in the animal's urine. As the urea decomposes into ammonia, unpleasant odors are produced. Accordingly, in the present embodiments, an odor eliminating agent (such as a naturally-occurring or synthetic zeolite) may be added to absorb ammonia. In one embodiment, the naturally-occurring zeolite may be clinoptilolite, which has the chemical formula $(Na, K, Ca)_{2-3}Al_3(Al, Si)_2Si_{13}O_{36} \cdot 12(H_2O)$ and is commercially available. Synthetic zeolites may include zeolites for any number of a class of zeolites including Zeolite A, Zeolite X, Zeolite Y, and the like. In one embodiment, molecular sieves were used for odor control including, without limitation, 13×, Sodium Y, Ammonium Y, and ZSM-5 to name a few.

Other additional ingredients that may be added 145 comprise a pH adjustor and/or silica gel. Like the clinoptilolite, the pH adjuster and/or silica gel may be helpful in absorbing odors and/or preventing the formation of ammonia gas. In fact, the pH adjuster and/or silica gel may operate to convert some or all of the ammonia gas ($NH_3$) into ammonium ions ($NH_4^+$). These ammonium ions reduce emission of gaseous ammonia from the composition. In some embodiments, the pH adjuster may be aluminum sulfate. The aluminum sulfate may be used in conjunction with silica gel.

A further ingredient that may be added 145 comprises a clumping agent. The clumping agent is added if a "clumping" litter is desired. A "clumping" litter is one that forms "clumps" (clustered mass) when wetted (such as by animal urine). "Clumping" litters are known in the art. A variety of known clumping agents are used. In some embodiments, the clumping agent may be sodium alginate, which is commercially available.

Another additional ingredient that may be added 145 comprises mineral oil and/or a surfactant. This mineral oil/surfactant is designed to be a "dedusting agent." More specifically, the mineral oil/surfactant prevents smaller particles, such as sodium alginate, from settling to the bottom of the package. If such settling occurs, there may be a fine "dust" that is produced when the package's contents are poured out from the bag/container. The dedusting agent binds the smaller particles (such as the sodium alginate) to larger particles in the composition (e.g., the geopolymerized ash), thereby reducing the likelihood that a fine dust will be formed.

The animal litter composition in one embodiment may contain between about 0 and about 10 weight percent of aluminum sulfate; between about 0 and about 20 weight percent of clinoptilolite; between about 0 and about 6 weight percent silica gel; between about 0 and about 5 weight percent sodium alginate; and between about 0 and about 10 weight percent mineral oil.

In another embodiment, the animal litter composition includes the following approximate weight percentages of the total mixture:
Aluminum sulfate (7%)
Clinoptilolite (5%)
Silica Gel (2%)
Mineral Oil (1%)
Sodium Alginate (1.5%)
Geopolymerized ash (comprises the rest of the composition).

It should be noted that the above-recited animal litter product contains about 1.5% sodium alginate, which is a "clumping agent." Accordingly, the above-recited composition constitutes a "clumping" animal litter. If a "non-clumping" animal litter is desired, then the sodium alginate may be omitted.

It should also be noted that the above-recited animal litter product contains various colored particles. These colored particles may be the geopolymerized ash and/or the silica gel particles. (It is noted that some silica gel particles have a bluish color.) It is known in the industry that adding colored solid particles to an animal litter composition is desirable. Specifically, in the animal litter industry, consumers believe that colored particles in the animal litter composition improves the performance of the animal litter. Such colored particles are thus added to many commercially available animal litters. Because the animal litter of the present embodiments already includes colored particles, there may be no need to add these additional colored particles to the animal litters of the present embodiments. Thus, the production costs associated with producing the animal litters of the present embodiments may decrease. However, further embodiments may also be designed in which additional colored particles are added to the present embodiments.

While many of the above-recited embodiments have been described in terms of animal litter products, those skilled in the art will recognize that the present embodiments are not limited to such applications. For example, the geopolymerized ash may be used as an absorbent material and used to clean up oil, chemical spills, base spills, or other spills. Other applications are also readily apparent. Thus, the present embodiments describe a method of making an absorbent material, which absorbent material may be an animal litter product in some embodiments.

In addition to the previously mentioned benefits, the described animal litter and associated method for making the animal litter can include several other beneficial characteristics. For example, pozzolanic ashes are typically landfilled, and thus the present methods provide a low-cost mechanism to recycle these pozzolanic ash materials. By providing this use for the pozzolanic ashes, the described methods can reduce pollution and the demand for landfill space. Likewise, the present embodiments provide a way to recycle/reuse spray dryer ash, which is a material that currently is not being recycled. For this reason, the embodiments of the present disclosure may be environmentally-friendly. Further, currently available cat litters comprise bentonite clay materials, which are extracted from the earth via strip mining processes. However, the present embodiments may be designed in which such bentonite clay materials are not used, or are used in limited amounts, thereby reducing the amount of material that must be extracted via strip mining.

In another example, the described geopolymerization reaction acts to entrap unwanted and heavy metals, such as Hg, As, Fe, Mn, Zn, Cr, Co, Pb, Cu, V, and Mg, within the geopolymerized ash. Accordingly, the described methods prevent such metals from leaching into the environment and causing harm to animals.

EXAMPLES

Animal litters containing geopolymerized ashes produced from the recipes supplied in Table 2 were tested and compared against several conventional cat litters.

For example, the absorbency capabilities of animal litters were tested. The results from these tests are shown below in Table 3.

TABLE 3

Comparison of Animal Litters Comprising Geopolymerized Ashes Produced According to the Specifications of Table 2 and Conventional Animal Litters.

| Sample Name | BET Surface Area ($m^2/g$) |
|---|---|
| Pozzolanic Ash #1 | 12.09 |
| Pozzolanic Ash #5 | 14.6026 |
| Pozzolanic Ash #6 | 9.2351 |
| Pozzolanic Ash #7 | 12.3891 |
| Arm & Hammer Super Scoop ® | 20.2726 |
| Purina Tidy Cat ® | 61.1311 |
| Fresh Step Scoop ® | 40.7914 |
| Tidy Cat Non-Clump ® | 39.7267 |
| Geopolymerized Avg. SA | 12.0792 |
| Commercial Litter Avg. SA | 40.48045 |

In Table 3, BET surface area refers to the total surface area of the sample. BET surface area may be measured by gas sorption of an inert gas, such as nitrogen, on the clean surface of dry solid powders. The amount of gas adsorbed at a given pressure is used to determine the surface area and is referred to as the BET surface area. BET surface area gives an insight into the porosity of our material. Highly porous materials tend to be more absorptive. Specifically, Table 3 shows that, in some embodiments, animal litters made according to the method of FIG. 1 may have an average external surface area that is greater than about 9-14 $m^2/g$. Table 3 further shows that, in some embodiments, animal litters made according to the described method may have an average external surface area that is greater than about 12 $m^2/g$.

A variety of additional tests were performed to test the "clumpability" of animal litters made from geopolymerized ashes, and more particularly from Class C fly ash, class F fly ash and SDA. The particular geopolymerized ash was made using a specific percentage of the alkaline activator and was sized with a −6 to +30 sieve, as described herein. In general, the alkaline activator was an aqueous solution of NaOH or NaOH mixed with $Na_2CO_3$. (The exact concentration of the activator solution is given in each example). For each batch of animal litter, 10 mL of deionized water was added to the sample to simulate cat urine. The ability of the litter to form clumps, based upon the addition of the water, was then rated using the following "clumpability" scale:

0-1=No clumping;
1-2=Clump crumbles easily
2-3=Clump breaks into smaller clumps
3-4=Slight crumbling of the clump
4-5=Solid, stable clump This scale was developed because a desirable animal litter will form a clump quickly and will stay in the clump form over time so that the user can easily scoop the clump when changing the litter box. Using this scale, the litter was analyzed at 4 different times:

0 minutes (immediately after contact with the deionized water)
5 minutes after contact with the deionized water
60 minutes after contact with the deionized water
48 hours (or more) after contact with the deionized water Thus, each litter sample has four different scores (one for each time) on the 0-5 rating scale. A "perfect" score for each time period would be a "5" whereas the total "perfect" composite score is 20. A "4" rating for a cat litter sample is considered an acceptable rating for each time period and a "16" composite score is also acceptable. Below is a table (Table 4) that indicates that "clumpability" test results for commercially available litters using the score parameters defined herein:

TABLE 4

Clumpability Test Results for Commercially Available Cat Litters

| Sample | Clump Rating at 0 Minutes | Clump Rating at 5 Minutes | Clump Rating at 60 Minutes | Clump Rating at 48 hours or more | Total Composite Score |
|---|---|---|---|---|---|
| Tidy Cat Scoopable | 5 | 5 | 5 | 5 | 20 |
| Fresh Step Scoopable | 5 | 5 | 5 | 5 | 20 |
| Arm & Hammer Super Scoop | 5 | 5 | 5 | 5 | 20 |
| Tidy Cats Clay Litter | 0 | 0 | 0 | 0 | 0 |

As can be seen from Table 4, the commercially available "scoopable" cat litters all have a perfect composite score of "20" and display excellent clumpability.

Using the samples prepared in Table 5, various animal litters were prepared and mixed with a quantity of commercial kitty litter (which is essentially a bentonite clay clumping additive added to the fly ash litter). The following table illustrates the results and gives the total composite score for each test:

TABLE 5

Results Using the Clumpability Scale

| Sample Name | No Additive | 10% | 20% | 30% | 40% | 50% |
|---|---|---|---|---|---|---|
| Pozzolanic Ash #1 | 12 | 15 | 16 | 17 | 20 | 20 |
| Pozzolanic Ash #2 | 9 | 11 | 15 | 17 | 19 | 20 |
| Pozzolanic Ash #3 | 0 | No Data | No Data | No Data | No Data | No Data |
| Pozzolanic Ash #4 | 12 | No Data | No Data | No Data | No Data | No Data |
| Pozzolanic Ash #5 | 0 | 5 | 9 | 10 | 19 | 20 |
| Pozzolanic Ash #6 | 0 | 3 | 9 | 15 | 18 | 20 |
| Pozzolanic Ash #7 | 0 | 3 | 6 | 15 | 18 | 19 |
| Pozzolanic Ash #8 | 0 | 9 | 11 | 15 | 17 | 18 |
| Pozzolanic Ash #9 | 6 | 6 | 10 | 17 | 19 | 20 |

Under one interpretation, the results of these clumping tests may be summarized as follows:
  Any fly ash (Class C or Class F) litter that is mixed with 40 or 50% bentonite clay litter will have acceptable clumping;
  These results further indicate that using bentonite clay is a good clumping agent for litters that comprise at least 40-50% bentonite clay (and only 50-60% geopolymerized ash). However, for embodiments in which the percentage of geopolymerized ash is higher than 50-60%, a different clumping agent may be used.
Additional tests involving other clumping additives were also performed. Specifically, sodium alginate was tested as a clumping agent. In performing these tests, 150 grams of a litter product were prepared with the clumping agent added in the proportions listed below. The ability of this litter product to form clumps (after the addition of 10 mL of deionized water) was then tested over time using the clumping scale outlined above. The following table indicates the results:

TABLE 6

Clumping Agent Test regarding Sodium Alginate. In each of these samples, 1.5%, by weight, of sodium alginate was added.

| Test # | Clump Rating after 0 minutes | Clump Rating after 5 minutes | Clump Rating after 60 minutes | Clump Rating after 48 hours | Total | % Survival of the Clump after Hardness Test |
|---|---|---|---|---|---|---|
| Test #1 | 5 | 5 | 5 | 5 | 20 | 98 |
| Test #2 | 5 | 5 | 5 | 5 | 20 | 95 |
| Test #3 | 5 | 5 | 5 | 5 | 20 | 99 |
| Test #4 | 5 | 5 | 5 | 5 | 20 | 93 |
| Test #5 | 5 | 5 | 5 | 5 | 20 | 99 |
| Test #6 | 5 | 5 | 5 | 5 | 20 | 95 |
| Test #7 | 5 | 5 | 5 | 5 | 20 | 98 |
| Test #8 | 5 | 5 | 5 | 5 | 20 | 99 |
| Test #9 | 5 | 5 | 5 | 5 | 20 | 99 |
| Test #10 | 5 | 5 | 5 | 5 | 20 | 99 |
| Test #11 | 5 | 5 | 5 | 5 | 20 | 98 |
| Test #12 | 5 | 5 | 5 | 5 | 20 | 98 |
| Test #13 | 5 | 5 | 5 | 5 | 20 | 84 |
| Test #14 | 5 | 5 | 5 | 5 | 20 | 81 |
| Test #15 | 5 | 5 | 5 | 5 | 20 | 96 |
| Test #16 | 5 | 5 | 5 | 5 | 20 | 87 |
| Test #17 | 5 | 5 | 5 | 5 | 20 | 97 |
| Test #18 | 5 | 5 | 5 | 5 | 20 | 91 |
| Test #19 | 5 | 5 | 5 | 5 | 20 | 97 |
| Test #20 | 5 | 5 | 5 | 5 | 20 | 98 |
| Average | 5 | 5 | 5 | 5 | 20 | 95 |

The results of Table 6 indicate, under one interpretation, that sodium alginate is an excellent clumping agent for fly ash litter products and will maintain a "clump" even after 48 hours time has elapsed.

In Table 6, there is a column entitled "% Survival of the Clump after Hardness Test." This data represents an additional "Hardness Test" that was performed on these samples. Specifically, if the litter sample passes the clumping tests (e.g., has a clumping score of "20" after 48 hours), a "Hardness Test" is performed which involves recording the weight of a clump prior to the test. The clump is then held twelve (12) inches above a clean, solid surface. (For this test, a steel table may be used as the solid surface.) The clump was then dropped to the solid surface and the weight of the clump, after dropping, is recorded. If the clump breaks upon impact, any pieces of the clump are collected and weighed, provided that the pieces would be large enough to be retained on the slots of a standard kitty litter scoop. Once this weight has been obtained, then a calculation is performed to calculate the % survival of the clump using the following equation.

% Survival=100×(mass final)/(mass initial)

For the "Hardness test," a % survival that is close to 100 is desired. As can be seen from the results shown in Table 6, many of the samples having sodium alginate as the clumping agent produce excellent results. Specifically, the % Survival after the Hardness test is nearly 100% for many samples.

Testing has also been performed on the present embodiments of animal litter products to determine the Cation Exchange Capacity ("CEC") of these products. These results are provided below. The following abbreviations are used for simplicity in the following table:
  BDL=below detection limits.
  SDA=Spray Dryer Ash.

TABLE 7

Cation Exchange Capacity Results for Various Fly Ash and Cat Litter Products

| Sample Name | Type of Pozzolanic Ash | CEC (meq/g) |
|---|---|---|
| Untreated Pozzolanic Ash #1-5 | Class C | BDL < 0.018 |
| Untreated Pozzolanic Ash #6 | SDA | BDL < 0.018 |
| Pozzolanic Ash #1 | Class C | 0.05 ± 0.02 |
| Pozzolanic Ash #2 | Class C | 0.11 ± 0.02 |
| Pozzolanic Ash #3 | Class C | 0.08 ± 0.01 |
| Pozzolanic Ash #4 | Class C | 0.039 ± 0.005 |
| Pozzolanic Ash #5 | Class C | 0.26 ± 0.03 |
| Pozzolanic Ash #6 | SDA | 0.24 ± 0.03 |
| Arm & Hammer Super Scoop ® | N/A | 0.8 ± 0.1 |
| Purina Tidy Cat ® | N/A | 0.30 ± 0.04 |
| Fresh Step Scoop ® | N/A | 0.53 ± 0.07 |

All fly ash samples, as received, result in a CEC<0.03 meq/g. Treatment conditions to agglomerate fly ash into litter (geopolymerization) will increase those to CEC between 0.04 to 0.3 meq/g and potentially higher as treatment conditions are optimized. It is believed that the addition of an odor eliminating agent will increase these values to a CEC that is comparable to commercial kitty litters that contain odor controlling substances (characterized by a CEC of 0.3 to 0.8 meq/g).

The bulk density of the animal litter products were also tested. This bulk density data is found in Table 8.

TABLE 8

Bulk Density Data for Various Fly Ash and Cat Litter Products

| Sample Name | Bulk Density (lb/ft$^3$) |
|---|---|
| Pozzolanic Ash #1 | 63.2 ± 0.5 |
| Pozzolanic Ash #2 | 65.8 ± 0.5 |
| Pozzolanic Ash #3 | 64.7 ± 0.2 |
| Pozzolanic Ash #4 | 56.3 ± 0.3 |
| Pozzolanic Ash #5 | 59.8 ± 0.4 |
| Pozzolanic Ash #6 | 55.6 ± 0.4 |
| Pozzolanic Ash #7 | No Data |
| Pozzolanic Ash #8 | No Data |
| Pozzolanic Ash #9 | No Data |
| Arm & Hammer Super Scoop ® | 72.5 ± 0.9 |
| Purina Tidy Cat ® | 57.8 ± 0.2 |
| Fresh Step Scoop ® | 74.3 ± 0.1 |
| Pozzolanic Avg. Bulk Density | 60.9 |
| Commercial Avg. Bulk Density | 68.2 |

It has been found that the difference in the concentration of alkaline activator may be significant. From a cost perspective, it may be desirable to use as little of the alkaline additive as possible. However, using little amounts of additive may increase the amount of "dust" in the cat litter, thereby increasing the "dust on pour" amount. ("Dust on pour" is an industry used term that measures how much dust is emitted during the pouring process.) Emitting dust from the cat litter product, especially when it is poured into the litter box, may be undesirable to consumers as it may make the "pouring" process messy. Accordingly, using a greater amount of additive, such as up to a solution that contains about 12% alkaline additive, may reduce the dust associated with the litter product and may lower the "dust on pour" amount of each litter. It has been found that, in some embodiments, a 6% solution of the alkaline additive may be appropriate. Percent dust is quantified by sieving 100 g of fly ash animal litter with a U.S. Standard No. 100 sieve and collecting all the material that passes through. The −100 fines collected is the percent dust in the animal litter. It is also believed that clumping is proportional to % Dust (before adding any sort of clumping agent). The higher the dust (without the clumping agent), the better it may clump.

Table 9, listed below, indicates the percentage of "dust" that is found in the animal litters made herein:

TABLE 9

Table Dust Percentage Data for Various Fly Ash and Cat Litter Products

| Sample Name | % Dust |
|---|---|
| Pozzolanic Ash #1 | 11 |
| Pozzolanic Ash #2 | 1.8 |
| Pozzolanic Ash #3 | 0.56 |
| Pozzolanic Ash #4 | 1.63 |
| Pozzolanic Ash #5 | 0.6 |
| Pozzolanic Ash #6 | 2.1 |
| Pozzolanic Ash #7 | 2.1 |
| Pozzolanic Ash #8 | 6 |
| Pozzolanic Ash #9 | No Data |
| Tidy Cat Non-Clump ® | 0.04 |
| Arm & Hammer Super Scoop ® | 0.32 |
| Fresh Step Scoop ® | 0.6 |
| Purina Tidy Cat ® | 0.05 |

Testing has also been performed regarding the use of various odor control agents that may be added to the present embodiments. In conducting tests regarding odor control agents, 10 mL of 1.5 wt % $NH_4OH$ (ammonia solution) was poured onto a sample of animal litter and a timer was started. The wetted sample was then smelled after one minute of elapsed time, after ten minutes of elapsed time, and after one hour of elapsed time. Each sample that was smelled as evaluated for the presence of ammonia odor using the following scale:

| 1 | Very Strong smell of ammonia |
| 2 | Strong smell of ammonia |
| 3 | Weak smell of ammonia |
| 4 | Very Weak smell of ammonia |
| 5 | No Odor of ammonia |

For comparison purposes, commercial kitty litter products were tested in this manner. Specifically, commercially purchased Purina Tidy Cat® "Scoop" brand cat litter and Fresh Step Scoop® brand cat litter were tested using the odor test. The results of these odor tests on commercial animal litters are shown in Table 10:

TABLE 10

Odor test for Commercially Available Cat Litter Products

| Odor Test | 1 minute | 10 minutes | 1 hour |
|---|---|---|---|
| Fresh Step Scoop | | | |
| Test 1 | 2 | 3 | 4 |
| Test 2 | 2 | 2.5 | 4.5 |
| Test 3 | 2 | 2.5 | 4 |
| Average | 2.00 | 2.67 | 4.17 |
| Purina Tidy Cat ® "Scoop" | | | |
| Test 1 | 2 | 3 | 4.5 |
| Test 2 | 2 | 2.5 | 4.5 |

TABLE 10-continued

Odor test for Commercially Available Cat Litter Products

| Odor Test | 1 minute | 10 minutes | 1 hour |
|---|---|---|---|
| Test 3 | 1.5 | 2.5 | 4 |
| Average | 1.83 | 2.67 | 4.33 |

Thus, with respect to commercially available cat litter products, the average ammonia smell after 1 minute was 2 for Fresh Step® (a registered trademark of the Clorox Company) and 1.83 Tidy Cats® (a registered trademark of the Ralston Purina Company), after 10 minutes was 2.67 (in both cases) and after 1 hour was 4.17 and 4.33.

Various samples of animal litter products comprising geopolymerized ash were also tested using the smell test outlined above. The results for these tests are shown in Table 11. The animal litter products were designated as Sample #1, Sample #2 and Sample #3 and were prepared with the following ingredients (in which all weight percentages are percentages based on the total composition):

Sample #1
 Boric Acid 7%
 Clinoptilolite 5%
 Silica Gel 4%
 Sodium Alginate 1.5%
 Geopolymerized Ash (the remainder)

Sample #2
 Aluminum Sulfate 7%
 Clinoptilolite 5%
 Silica Gel 4%
 Sodium Alginate 1.5%
 Geopolymerized Ash (the remainder)

Sample #3
 Aluminum Sulfate 7%
 Clinoptilolite 5%
 Silica Gel 2%
 Sodium Alginate 1.5%
 Geopolymerized Ash (the remainder)

TABLE 11

Odor test for Cat Litter Products Containing Geopolymerized Ash Mixed With Various Odor Control Agents

| Odor Test | 1 min | 10 min | 1 hour |
|---|---|---|---|
| Sample #1 | | | |
| Test 1 | 1.5 | 3 | 5 |
| Test 2 | 2.5 | 3.5 | 4.5 |
| Test 3 | 2.5 | 3 | 4.5 |
| Average | 2.17 | 3.17 | 4.67 |
| Sample #2 | | | |
| Test 1 | 1.5 | 3 | 4.5 |
| Test 2 | 1.5 | 3 | 4 |
| Test 3 | 1.5 | 2.5 | 4 |
| Average | 1.50 | 2.83 | 4.17 |
| Sample #3 | | | |
| Test 1 | 2 | 3 | 5 |
| Test 2 | 1.5 | 3.5 | 5 |
| Test 3 | 2 | 3 | 4 |
| Average | 1.8 | 3.2 | 4.7 |

Figure 3:
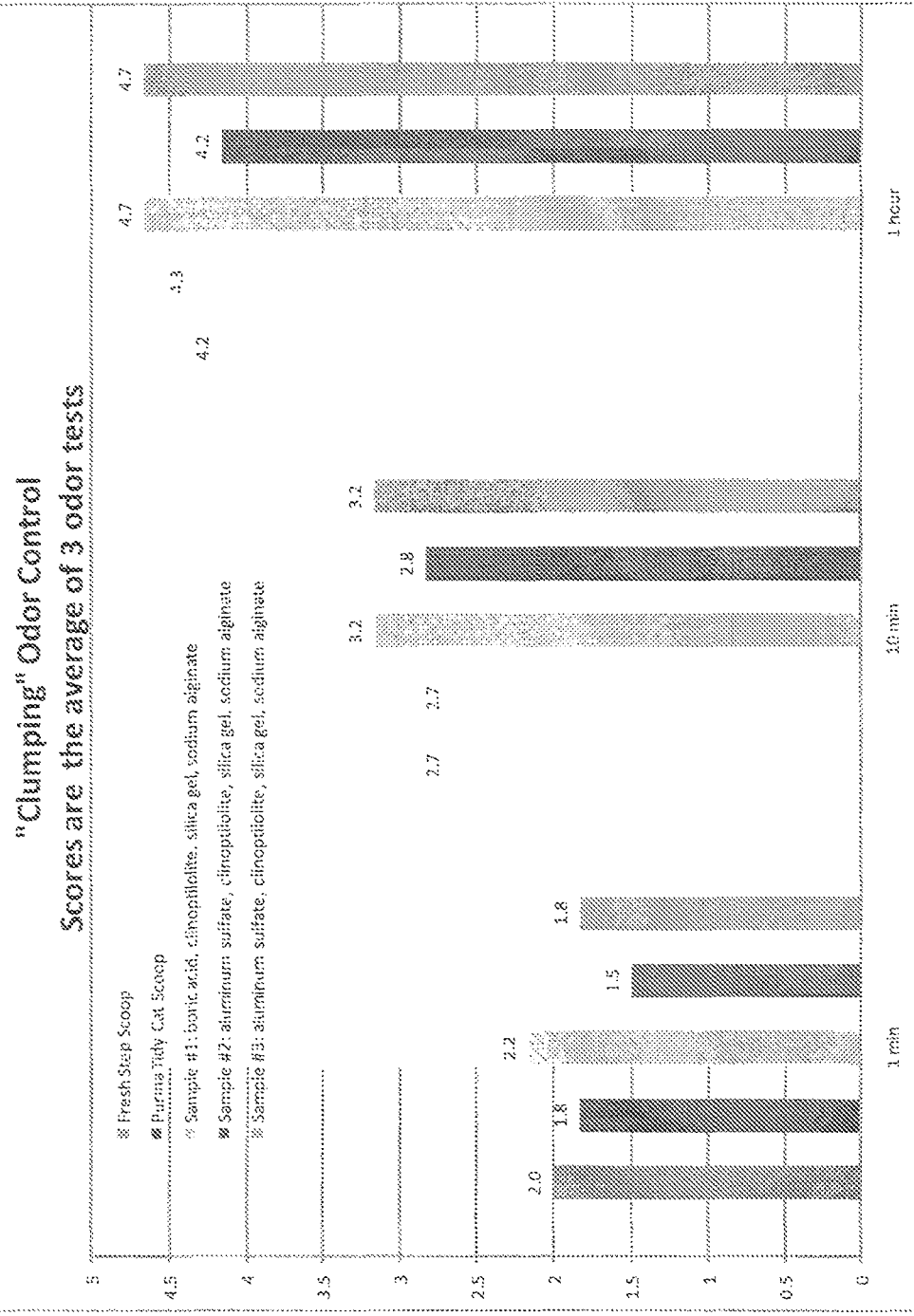
FIGS. 3 and 4 are graphical representations of various test results involving tests run on the present embodiments.

FIG. 3 shows a graph of the average value for each of the cat litters (including the commercial cat litters) that were tested. A statistical analysis performed on the data found in FIG. 3 reveals that differences in the results (values) are not statistically significant. In other words, Samples #1-3 produce results that are not statistically different than the results of the commercially available cat litter products. Thus, these results indicate that a pH adjustor and clinoptilolite are good odor control agents and can produce results that are similar to the odor-control available in commercial animal litter products.

Figure 4:
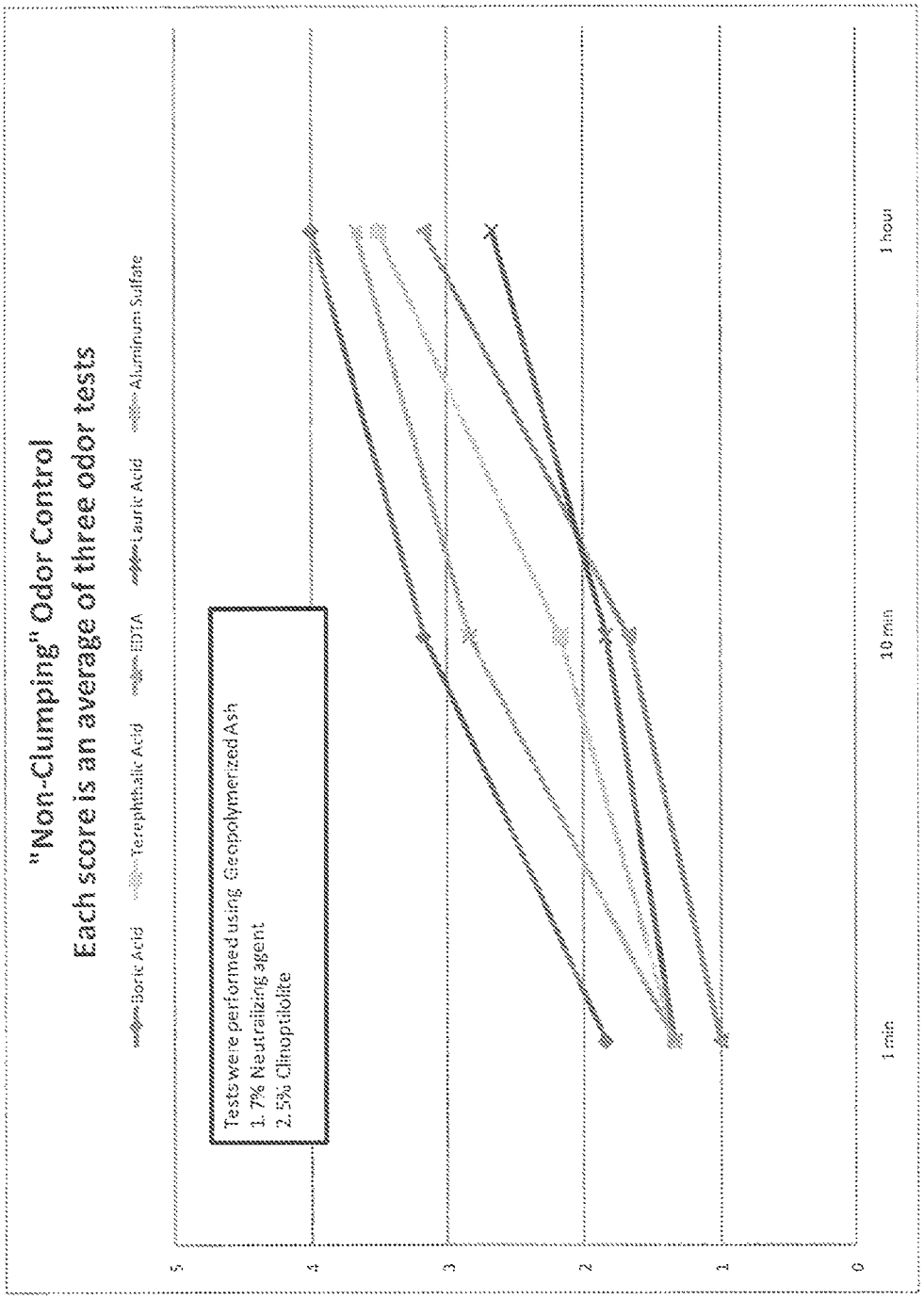

FIG. 4 shows a graph of various odor control tests that were performed on "non-clumping" animal litters. As these litters were "non-clumping," no clumping agent was added. Rather, the animal litter products included geopolymerized ash, clinoptilolite, and silica gel. These samples also included different "neutralizing agents," which could be boric acid, terephthalic acid, EDTA, lauric acid or aluminum sulfate. The scores shown in FIG. 4 are the average odor score (using the scale outlined above) of three tests of each of these samples. As can be seen from this data, boric acid and aluminum sulfate, when used with clinoptilolite and silica gel, appear to have the best odor control ability for non-clumping litters.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An animal litter composition comprising:
 geopolymerized ash particulates having a network of repeating aluminum-silicon units, wherein the geopolymerized ash particulates have a sieve size that is between about a 50 sieve and a −6 sieve, wherein the geopolymerized ash particulates are formed from a pozzolanic ask wherein the geopolymerized ash particulates have been dried.

2. The animal litter composition as in claim 1, further comprising:
 between about 0 and about 10 wt % aluminum sulfate;
 between about 0 and about 2 wt % clinoptilolite;
 between about 0 and about 6 wt % silica gel;
 between about 0 and about 5 wt % sodium alginate; and
 between about 0 and about 10 wt % mineral oil.

3. The animal litter composition as in claim 2, comprising:
 about 7 wt % aluminum sulfate;
 about 5 wt % clinoptilolite;
 about 2 wt % of silica gel;
 about 1.5 wt % sodium alginate; and
 about 1 wt % mineral oil.

* * * * *